United States Patent [19]

Ide et al.

[11] 3,856,894

[45] Dec. 24, 1974

[54] VINYL CHLORIDE POLYMER COMPOSITION CONTAINING A CROSS-LINKED METHYL METHACRYLATE COPOLYMER

[75] Inventors: Fumio Ide; Mamoru Asao, both of Otake; Akira Hasegawa, Hiroshima; Isao Sasaki, Iwakuni, all of Japan

[73] Assignee: Mitsubishi Rayon Co., Ltd., Tokyo, Japan

[22] Filed: Oct. 23, 1973

[21] Appl. No.: 408,448

Related U.S. Application Data

[63] Continuation-in-part of Ser. No. 211,663, Dec. 23, 1971, abandoned.

[30] Foreign Application Priority Data

Dec. 26, 1970  Japan.............................. 45-129610

[52] U.S. Cl. ............................ 260/899, 260/897 C

[51] Int. Cl. .......................................... C08f 29/24
[58] Field of Search ................................... 260/899

[56] References Cited
UNITED STATES PATENTS

| | | | |
|---|---|---|---|
| 3,055,859 | 9/1962 | Vollmert......................... | 260/899 X |
| 3,345,434 | 10/1967 | Griffith ............................. | 260/901 |
| 3,652,483 | 3/1972 | Tanaka et al................ | 260/29.7 UP |

*Primary Examiner*—Murray Tillman
*Assistant Examiner*—C. J. Seccuro
*Attorney, Agent, or Firm*—Armstrong, Nikaido & Wegner

[57] ABSTRACT

Processability of vinyl chloride polymer can be improved without affecting its chemical and physical properties by the incorporation therein of 0.1 to 30 percent by weight of specified methyl methacrylate copolymer having a cross-linked structure.

4 Claims, No Drawings

VINYL CHLORIDE POLYMER COMPOSITION CONTAINING A CROSS-LINKED METHYL METHACRYLATE COPOLYMER

CROSS REFERENCE TO RELATED APPLICATION

This application is a continuation-in-part of Ser. No. 211663 filed on Dec. 23, 1971, now abandoned.

BACKGROUND OF THE INVENTION

This invention relates to a vinyl chloride polymer composition which is superior in processability and is particularly suitable for extrusion, blow molding and vacuum forming thereof.

In general, polyvinyl chloride and vinyl chloride copolymers (referred to herein as "vinyl chloride polymer" for brevity) have superior physical and chemical properties and are therefore used as a raw material for various shaped articles. However, vinyl chloride polymer has defects in processability due to deficiency in the property of plasticity. For example, in the case of vacuum forming and blow molding of a film extruded through a T-die, it is difficult to obtain a shaped article possessing great depth and fine edges.

To obviate such defects, proposals have been reported where a polymethyl methacrylate or methyl methacrylate copolymer, a copolymer of styrene and alkyl acrylate, or a copolymer of acrylonitrile and styrene are incorporated into the vinyl chloride polymer. However, the incorporation of such copolymers other than polymethyl methacrylate or methyl methacrylate copolymer do not greatly enhance the processability, particularly for vacuum forming and pressure forming properties which are referred to hereinafter as "secondary processability".

The incorporation of polymethyl methacrylate or a copolymer containing methyl methacrylate as the principal ingredient (herein "methyl methacrylate polymer") improves the secondary processability, but presents certain problems. First, the extruded film exhibits no luster and has an orange-like skin, i.e., a fish eye on the surface, leading to reduction in value of the product made therefrom.

Secondly, the vinyl chloride polymer composition containing methyl methacrylate polymer cannot be advantageously subject to calendering (though calendering is acquiring importance year by year as a shaping technique for sheet or film) for the following reasons. The polymer composition adheres to the surface of the calender rollers because methyl methacrylate polymer has a great adhesion per se to a metal surface, which results in the sheet or film having a defective surface.

Thirdly, methyl methacrylate polymer exhibits a high melt viscosity, which fact together with above-mentioned high tendency of adhesion of the polymer to metal combines to cause a marked increase in torque when the vinyl chloride polymer composition containing methyl methacrylate polymer is extruded. The increase in torque is disadvantageous from the viewpoint of productivity.

SUMMARY OF THE INVENTION

From extensive research on additives to a vinyl chloride polymer in order to obtain a vinyl chloride polymer composition having improved processability, it has now been found that a methyl methacrylate copolymer having a crosslinked structure imparts the desired effect to the shaped product. That is, the vinyl chloride polymer composition of the present invention exhibits excellent secondary processabilities, which are similar to those of conventional vinyl chloride polymer composition containing methyl methacrylate polymer as an additive, and simultaneously, does not have any defects possessed by the conventional vinyl chloride polymer composition, i.e. the novel vinyl chloride polymer composition exhibts a far less adhesion to a metal surface and a far lower melt viscosity and produces a sheet having excellent luster when extruded.

In accordance with the present invention, there is provided a vinyl chloride polymer composition comprising: (i) 70 to 99.9 percent by weight of polyvinyl chloride or a copolymer containing 70 to 100 percent by weight of vinyl chloride and 0 to 30 percent by weight of at least one other copolymerizable monomer and (ii) 0.1 to 30 percent by weight of a copolymer consisting of methyl methacrylate; up to 69.995 percent and preferably 5 to 39 percent by weight of at least one other copolymerizable monofunctional vinyl monomer; and 0.005 to 2.0 percent by weight of at least one copolymerizable polyfunctional monomer. The composition exhibits a far lower melt viscosity and adhesion to a metal surface and produces a sheet or film having excellent luster when extruded and is superior in secondary processabilities.

DETAILED DESCRIPTION OF THE INVENTION

The vinyl chloride polymer component (i) of the present invention includes polyvinyl chloride and a copolymer containing no less than 70 percent by weight of vinyl chloride and no more than 30 percent by weight of at least one other copolymerizable ethylenically unsaturated monomer. The copolymerizable ethylenically unsaturated monomer includes for example, olefins such as ethylene, propylene, etc.; halogenated olefins such as dichloroethylene, etc.; vinyl esters such as vinyl acetate, etc.; and esters of acrylic acid, methacrylic acid and the like.

The methyl methacrylate copolymer component (ii) having a cross-linked structure to be incorporated into the above-mentioned vinyl chloride polymer component (i) is prepared by copolymerizing a mixture of preferably 61 to 99.995 percent by weight of methyl methacrylate, 5 to 39 percent by weight of at least one other copolymerizable monofunctional vinyl monomer and 0.005 to 2.0 percent by weight of at least one copolymerizable polyfunctional monomer.

The monofunctional vinyl monomer to be copolymerizable with methyl methacrylate is a component essential for producing a sheet of superior physical properties. If a crosslinked methyl methacrylate polymer, which does not contain the monofunctional vinyl monomer set forth above, is blended with a vinyl chloride polymer, the resulting polymer blend produces a sheet material having relatively many fish eyes on the surface, although the polymer blend is superior in adhesion to a metal surface.

In order to obtain at least a small amount of benefit, only a very small amount of the monofunctional vinyl monomer needs to be present in the methyl methacrylate copolymer component (ii). However, at least 5 percent by weight of the monofunctional vinyl monomer should be contained in order to produce a satisfactory sheet material. The maximum amount of the monofunctional vinyl monomer should be approximately 39 percent by weight. This is because, the more the amount of the vinyl monomer increases, the more prominently the following disadvantages develop. First, the resulting sheet is inferior in transparency, hue, surface luster and vacuum-forming property. Secondly, the resulting vinyl chloride polymer blend is prove to reduction of the melt viscosity and reduction of the velocity of gelation, when heated, and hence becomes inferior in processability.

The monofunctional vinyl monomer includes for example alkyl ester of acrylic acid, the alkyl group having 1 to 20 carbon atoms, styrene, acrylonitrile and the like. The most preferable vinyl monomer is alkyl ester of acrylic acid, such as ethyl acrylate, methyl acrylate and n-butyl acrylate. These monomers may be used alone or in a mixture thereof.

The polyfunctional monomer used herein refers to the monomer having at least two ethylenically unsaturated double bonds in the molecule. As the polyfunctional monomer, most preferable is the compound represented by the formula:

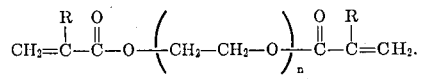

wherein R is hydrogen or an alkyl group having 1 to 2 carbon atoms and $n$ is a positive integer, such as ethylene glycol dimethacrylate, ethylene glycol diacrylate, diethylene glycol dimethacrylate, diethylene glycol diacrylate, triethylene glycol dimethacrylate, triethylene glycol diacrylate, tetraethylene glycol dimethacrylate and tetraethylene glycol diacrylate. Besides the above, the polyfunctional monomer includes, for example, divinylbenzene, divinyl adipate, bis (ethylene glycol) phthalate diacrylate, bis (ethylene glycol) phthalate dimethacrylate, bis (diethylene glycol) phthalate diacrylate, bis (diethylene glycol) phthalate dimethacrylate, allyl methacrylate, diallyl phthalate, maleate, diallyl itaconate and triallyl cyanurate. These may also be used alone or in a mixture thereof.

The amount of the polyfunctional monomer should be 0.005 to 2.0 percent by weight, preferably 0.005 to 1.0 percent by weight. When the amount is less than 0.005 percent by weight, the benefit of the present invention can not be really obtained. When the amount exceeds 2.0 percent by weight, the resulting sheet exhibits a deteriorated vacuum forming property, i.e. reduced extensibility at a high temperature, and a lower transparency.

Apparently, the particular manner whereby the methyl methacrylate copolymer is incorporated into the vinyl chloride polymer is also not critical. The methyl methacrylate copolymer can, for example, be simply physically blended in a dry state with the vinyl chloride polymer by a conventional mixer such as a Henschel mixer. Further, small amounts of additives such as stabilizer, colorant, plasticizer, filler and the like may be incorporated into the composition of the present invention, if desired.

In the practice of the present invention, at least 0.1 percent by weight, based on the weight of the composition, of a methyl methacrylate copolymer having a cross-linked structure should be present in the resulting composition in order that at least some benefit of the present invention may be obtained. The incorporation of a large amount, i.e. exceeding 30 percent, of the copolymer unfavorably affects the characteristics of a vinyl chloride polymer. It is therefore preferred that the total amount of the methyl methacrylate copolymer present in the composition is within the range of 0.1 to 30 percent by weight.

The composition of the present invention may be shaped into any desired form by a suitable shaping process such as injection molding, extrusion, calendering, blow molding, vacuum forming, pressure forming and the like.

The invention will be further illustrated with reference to examples, in which all "parts" and "percent" are by "weight".

EXAMPLE I

1. Preparation of methyl methacrylate copolymer having a cross-linked structure:

200 parts of distilled water and 2.0 parts of potassium oleate were charged into a reactor equipped with a reflux condenser and two dropping funnels. After the reactor was heated at 70°C and blown with nitrogen, two mixtures, one consisting of 85 parts of methyl methacrylate, 15 parts of methyl acrylate, 0.5 part of ethylene glycol dimethacrylate and 0.1 part of t-dodecylmercaptan and the other consisting of 100 parts of distilled water and 0.2 part of potassium persulfate were simultaneously and separately dropped into the reactor at a given rate through the two funnels respectively, whilst the content in the reactor was stirred, so as to perform polymerization thereby. After the dropping of the two mixtures was simultaneously ended, resultant resulatant was further stirred for one hour with the temperature maintained at 70°C to complete polymerization. Thus, approximately 400 parts of a copolymer latex were obtained. The copolymer latex was then poured into an aqueous solution of 2.0 parts aluminum chloride in 1200 parts of distilled water at a temperature of 60° C to be coagulated. The copolymer was recovered by filtration, washed and dried.

2. Preparation of vinyl chloride polymer composition:

100 parts of polyvinyl chloride (Nikavinyl SG-700, made by NIHON CARBIDE CO., Japan), 4 parts of the copolymer prepared as mentioned in the preceding item (1), 3 parts of dibutyltin maleate (N-2000E made by NITTO KASEI CO., Japan) and 2 parts of dioctyl phthalate were mixed in a Henschel mixer at 1800 rpm until the temperature of the mixture reached 100°C.

3. Characteristics of the vinyl chloride composition:

Adhesion of the vinyl chloride composition to a metal surface was determined by the following procedure. 100 g of the vinyl chloride composition was milled between a pair of rollers of 6 inch diameter, one rotating at 14 rpm and having a temperature of 170°C and the other rotating at 19 rpm and having a temperature of 165°C. The milled material winding around one of the rollers, i.e., the one having a higher temperature, was cut at one place in a traverse direction while the rollers rotated, and one end of the material was peeled off from the roller by hand and immediately released. The milled material hung down under its dead weight and did not naturally rewind around the roller.

Another vinyl chloride polymer composition, which was prepared in the same manner as that mentioned in the preceding item (2) except that the methyl methacrylate copolymer was not added (which composition is shown as "blank" in Table 1), also hung down under its dead weight and did not naturally rewind around the roller when tested by the same procedure as the above.

"Q value" (melt flow rate expressed in cc per sec) of the vinyl chloride compositions and "elongation at break" and "reflectance" of sheet specimens prepared by extruding the compositons using a T-die were determined. These results are shown in Table 1. Q value was determined using a Koka-type Flow Tester under the following conditions: temperature, 180°C; nozzle size, 1 mm$\phi$ × 2 mm; load, 100 kg. Elongation at break was determined using Tensilon at a temperature of 100°C and at the rate of 50 mm/min. Reflectance was determined by measuring the ratio of luminous flux reflected from, to that incident on, a specimen (incidence angle; 60°). A polished surface of cast methyl methacrylate resin plate was assigned a reflectance of 100 as a standard of comparison.

"Time for gelation (Rg)" of the vinyl chloride polymer compositions and "number of fish eyes" (FE) occurring on the sheet specimens were also determined. Rg is calculated from the equation: Rg(kg.m/min) = Mmax/Tmax. In the equation, Mmax is maximum torque (Kg.m) and Tmax is the time (minutes) required for the maximum torque being recorded. The Mmax and Tmax were measured by Brabender plastograph. A large Rg value means that gelation of the resin proceeds at a high velocity, and hence the resin is superior in processability. "Number of fish eyes" (FE) was determined as follows. The resin was extruded by an extruder having a screw of a 40 mm diameter and a T-die into a sheet of a 0.05 mm thickness. The number of fish eyes occurring in a 20 × 30 cm² area of the sheet was counted. The number of fish eye (FE) was expressed in terms of three grades, i.e., A, B and C, which denote respectively, that the number of fish eyes is less than 5; from 5 to 20; and more than 20.

COMPARATIVE EXAMPLE 1

A methyl methacrylate copolymer was prepared in the same manner as that of Example 1, item (1) except for no addition of 0.5 part of ethylene glycol dimethacrylate. A polyvinyl chloride composition was prepared in the same manner as that of Example 1. Characteristics of the composition are shown in Table 1.

EXAMPLE 2

The procedure of Example 1 was repeated in order to prepare a polyvinyl chloride composition wherein 0.5 part of divinylbenzene was used in substitution for 0.5 part of ethylene glycol dimethacrylate with all other conditions remaining the same. Characteristics of the composition are shown in Table 1.

EXAMPLE 3

The procedure of Example 1 was repeated in order to prepare a polyvinyl chloride composition wherein 0.5 part of triallyl cyanurate was used in substitution for 0.5 part of ethylene glycol dimethacrylate with all other conditions remaining the same. Characteristics of the composition are shown in Table 1.

COMPARATIVE EXAMPLE 2

The procedure of Example 1 was repeated in order to prepare a polyvinyl chloride composition wherein a monomer mixture of 55 parts of methyl methacrylate, 30 parts of stryene, 15 parts of methyl acrylate and 1.0 part of ethylene glycol dimethacrylate was used in substitution for that of Example 1 for the preparation of a methyl methacrylate copolymer. Characteristics of the composition are shown in Table 1.

COMPARATIVE EXAMPLE 3

The procedure of Example 1 was repeated in order to prepare a polyvinyl chloride composition wherein a monomer mixture of 35 parts of methyl methacrylate, 50 parts of styrene, 15 parts of methyl acrylate and 1.0 part of ethylene glycol dimethacrylate was used in substitution for that of Example 1 for the preparation of a methyl methacrylate copolymer. Characteristics of the composition are shown in Table 1.

COMPARATIVE EXAMPLE 4

The procedure of Example 1 was repeated in order to prepare a polyvinyl chloride composition wherein a monomer mixture of 15 parts of methyl methacrylate, 15 parts of methyl acrylate, 69 parts of styrene and 1.0 part of ethylene glycol dimethacrylate was used in substitution for that of Example 1 for the preparation of a methyl methacrylate copolymer. Characteristics of the composition are shown in Table 1.

COMPARATIVE EXAMPLE 5

The procedure of Example 1 was repeated in order to prepare a polyvinyl chloride composition wherein a monomer mixture of 85 parts of methyl methacrylate, 15 parts of methyl acrylate and 0.001 part of ethylene glycol dimethacrylate was used in substitution for the Example 1 for the preparation of a methyl methacrylate copolymer. Characteristics of the composition are shown in Table 1.

COMPARATIVE EXAMPLE 6

The procedure of Example 1 was repeated in order to prepare a polyvinyl chloride composition wherein a monomer mixture of 83 parts of methyl methacrylate, 14 parts of methyl acrylate and 3.0 parts of ethylene glycol dimethacrylate was used in substitution for that of Example 1 for the preparation of a methyl methacrylate copolymer. The sheet extruded from the composition was white turbid. Characteristics of the composition are shown in Table 1.

EXAMPLE 4

The procedure of Example 1 was repeated in order to prepare a polyvinyl chloride composition wherein the amount of ethylene glycol dimethacrylate used was 0.005 part in substitution for 0.5 part with all other conditions remaining the same. Characteristics of the composition are shown in Table 1.

EXAMPLE 5

The procedure of Example 1 was repeated in order to prepare a polyvinyl chloride composition wherein a monomer mixture 65 parts of methyl methacrylate, 34 parts of methyl acrylate and 1.0 part of ethylene glycol dimethacrylate was used in substitution for that of Example 1 for the preparation of a methyl methacrylate copolymer. Characteristics of the composition are shown in Table 1.

EXAMPLE 6

The procedure of Example 1 was repeated in order to prepare a polyvinyl chloride composition wherein a monomer mixture 94 parts of methyl methacrylate, 5 parts of methyl acrylate and 1.0 part of ethylene glycol dimethacrylate was used in substitution for that of Example 1 for the preparation of a methyl methacrylate copolymer. Characteristics of the composition are shown in Table 1.

and 1.0 part of ethylene glycol dimethacrylate was used in substitution for that of Example 1 for the preparation of a methyl methacrylate copolymer. Characteristics of the composition are shown in Table 1.

Table 1

| No. | Composition of methyl methacrylate copolymer | | | | Adhesion to metal surface | Q value (cc/sec) | Elongation at break (%) | Reflectance (%) | Rg (kg.m/min) | Number of FE |
|---|---|---|---|---|---|---|---|---|---|---|
| | MAA | MA | ST | PM | | | | | | |
| Blank | — | — | — | — | B | $18 \times 10^{-3}$ | 300 | 83.4 | 2.4 | A |
| Example 1 | 85 | 15 | — | EDMA 0.5 | B | $22 \times 10^{-3}$ | 1100 | 93.1 | 2.0 | A |
| Comparative Example 1 | 85 | 15 | — | 0 | A | $11 \times 10^{-3}$ | 1200 | 87.3 | 1.6 | A |
| Example 2 | 85 | 15 | — | DVB 0.5 | B | $18 \times 10^{-3}$ | 1200 | 93.3 | 2.1 | A |
| Example 3 | 85 | 15 | — | TAC 0.5 | B | $16 \times 10^{-3}$ | 1050 | 90.5 | 1.9 | A |
| Comparative Example 2 | 55 | 15 | 30 | EDMA 1.0 | B | $25 \times 10^{-3}$ | 1000 | 94.0 | 0.75 | A |
| Comparative Example 3 | 35 | 15 | 50 | EDMA 1.0 | B | $83 \times 10^{-3}$ | 1040 | 90.0 | 0.36 | A |
| Comparative Example 4 | 15 | 15 | 69 | EDMA 1.0 | B | $125 \times 10^{-3}$ | 510 | 80.6 | 0.27 | A |
| Comparative Example 5 | 85 | 15 | — | EDMA 0.001 | A | $11 \times 10^{-3}$ | 1200 | 87.5 | 1.5 | A |
| Comparative Example 6 | 83 | 14 | — | EDMA 3.0 | B | $21 \times 10^{-3}$ | 400 | 88.5 | 1.4 | A |
| Example 4 | 85 | 15 | 30 | EDMA 0.005 | B | $20 \times 10^{-3}$ | 1100 | 91.5 | 2.0 | A |
| Example 5 | 65 | 34 | — | EDMA 1.0 | B | $24 \times 10^{-3}$ | 1000 | 90.8 | 1.8 | A |
| Example 6 | 94 | 5 | — | EDMA 1.0 | B | $18 \times 10^{-3}$ | 982 | 91.2 | 2.0 | A |
| Comparative Example 7 | 97 | 2 | — | EDMA 1.0 | B | $16 \times 10^{-3}$ | 905 | 90.9 | 2.1 | B |
| Comparative Example 8 | 99 | 0 | — | EDMA 1.0 | B | $14 \times 10^{-3}$ | 862 | 91.0 | 2.1 | C |

Note:
MMA, Methyl methacrylate
HA, Methyl acrylate
ST, Styrene
PM, Polyfunctional monomer

COMPARATIVE EXAMPLE 7

The procedure of Example 1 was repeated in order to prepare a polyvinyl chloride composition wherein a monomer mixture of 97 parts of methyl methacrylate, 2 parts of methyl acrylate and 1.0 part of ehtylene glycol dimethracrylate was used in substitution for that of Example 1 for the preparation of the methyl methacrylate copolymer. Characteristics of the composition are shown in Table 1.

COMPARATIVE EXAMPLE 8

The procedure of Example 1 was repeated in order to prepare a polyvinyl chloride composition wherein a monomer mixture of 99 parts of methyl methacrylate

What we claim is:

1. A vinyl chloride polymer composition comprising:
   i. 70 to 99.9 percent by weight of a vinyl chloride polymer containing 70 to 100 percent by weight of vinyl chloride and 0 to 30 percent by weight of at least one other copolymerizable monomer; and
   ii. 0.1 to 30 percent by weight of a copolymer consisting of methyl methacrylate, 5 to 39 percent by weight of at least one other copolymerizable monofunctional vinyl monomer and 0.005 to 2.0 percent by weight of at least one copolymerizable polyfunctional monomer.

2. A vinyl chloride polymer composition according to claim 1, wherein said copolymerizable polyfunctional monomer is at least one selected from the group consisting of divinylbenzene, divinyl adipate, ethylene glycol dimethacrylate, ethylene glycol diacrylate, diethylene glycol dimethacrylate, diethylene glycol diacrylate, triethylene glycol dimethacrylate, triethylene glycol diacrylate, tetraethylene glycol dimethacrylate, tetraethylene glycol diacrylate, bis(ethylene glycol)phthalate di-acrylate, bis(ethylene glycol)phthalate dimethacrylate, bis(diethylene glycol)phthalate diacrylate, bis(diethylene glycol)phthalate dimethacrylate, allyl methacrylate, diallyl phthalate, diallyl maleate, diallyl itaconate and triallyl cyanurate.

3. A vinyl chloride polymer composition according to claim 1, wherein said copolymerizable monofunctional vinyl monomer is at least one selected from the group consisting of alkyl ester of acrylic acid, the alkyl group having 1 to 20 carbon atoms, styrene and acrylonitrile.

4. A shaped article formed from the vinyl chloride composition in claim 1.

* * * * *